(No Model.)
J. S. TAYLOR & C. DAVIES.
SUCTION CONNECTION DEVICE.
No. 566,816. Patented Sept. 1, 1896.
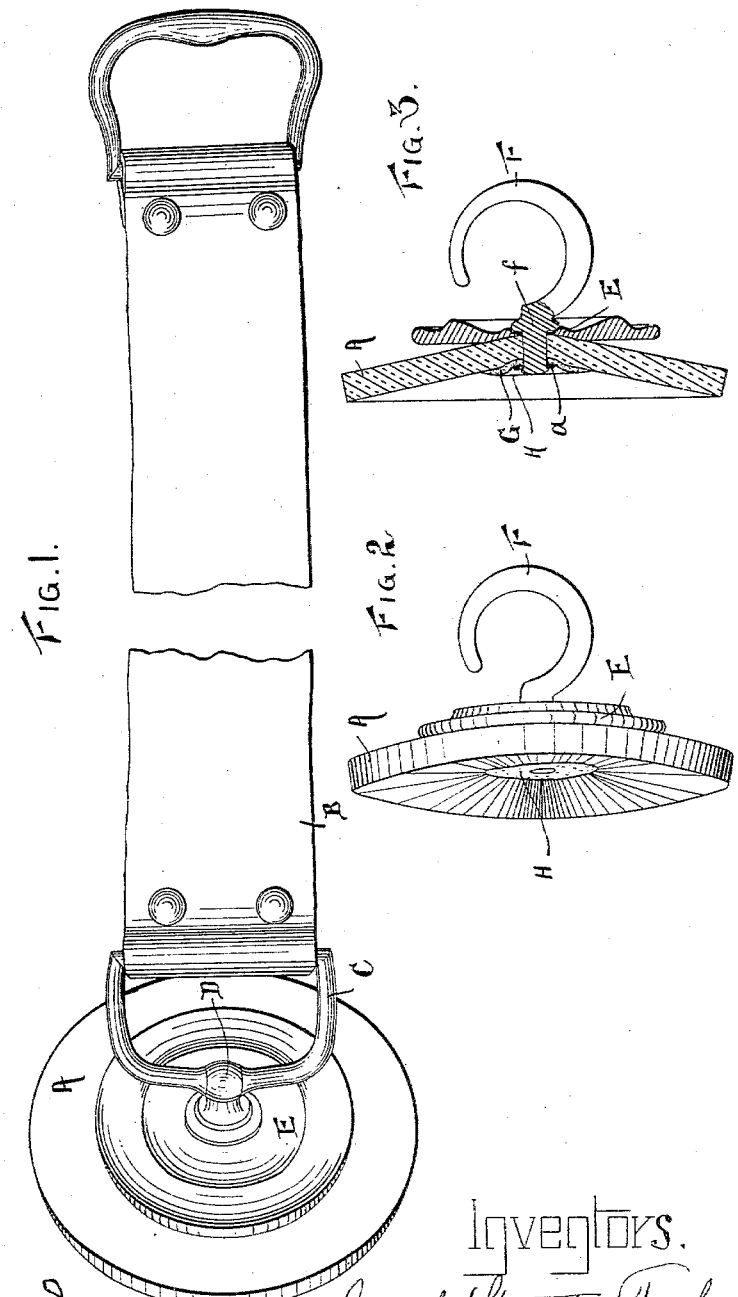
Witnesses
M. V. Bidgood
J. Green
Inventors.
Joseph Stanton Taylor
and
Charles Davies
By _____ Attys

UNITED STATES PATENT OFFICE.

JOSEPH STAINTON TAYLOR AND CHARLES DAVIES, OF LIVERPOOL, ENGLAND.

SUCTION-CONNECTION DEVICE.

SPECIFICATION forming part of Letters Patent No. 566,816, dated September 1, 1896.

Application filed March 13, 1896. Serial No. 582,804. (No model.)

*To all whom it may concern:*

Be it known that we, JOSEPH STAINTON TAYLOR and CHARLES DAVIES, subjects of the Queen of Great Britain, residing at Liverpool, in the county of Lancaster, in the Kingdom of England, have invented certain new and useful Improvements in Suction-Connection Devices, of which the following is a specification.

The object of this invention is to provide a device for holding or fastening razor-strops, gymnastic appliances, and other articles to walls, windows, furniture, or other fixed objects.

In carrying our invention into effect the plan we prefer is to provide a pneumatic fastening device or connection, which is arranged in such a manner that the article can be almost instantly fixed in place.

It consists of a piece of rubber, by preference slightly cup-shaped and provided with a hook, eye, or its equivalent, to which the razor-strop or other article is coupled.

In the accompanying drawings, Figure 1 is a general view showing our invention applied to a razor-strop ready for use; Fig. 2, a perspective view of the pneumatic fastening device; Fig. 3, a cross-section thereof.

In the figures the pneumatic device is formed of a slightly cup-shaped piece of rubber A, to which the stop B is coupled by means of a link C, pivot D, and metal washer E, as depicted in Fig. 1. In Figs. 2 and 3 a slight modification is shown in which the cup-shaped piece of rubber A is provided with a hook F, to which an eye on the end of the strop may be coupled, so that the strop can be easily attached or detached from the hook at pleasure. The shank $f$ of the hook F is passed through the central hole in the rubber disk A and riveted at the back over a washer $a$, a leather or other washer G being first laid against the rubber, as shown. The riveting of the shank $f$ is then covered over by a shield H, which is solutioned or otherwise affixed to the rubber. It will thus be seen that the hook F is secured to the rubber A in an air-tight manner, the shank $f$ being riveted at the back over the washer $a$, thus making in conjunction with the metal washer E in front and the leather washer G behind an air-tight fastening between the rubber and the hook. By firmly pressing this slightly cup-shaped piece of rubber A onto a flat surface the air is expelled, and the grip thus obtained will resist any reasonable pull. To remove the article from the surface, all that is necessary is to lift the edge at one point of the rubber slightly, so as to admit air underneath and the device will immediately drop off.

We declare that what we claim is—

A suction-connection device consisting of a slightly cup-shaped disk of rubber A and a hook, eye or its equivalent, the shank of which is passed through a hole in the center of the said cup-shaped disk, in combination with a metal washer E in front and the washers G and $a$ at back over which the shank aforesaid is riveted, whereby an air-tight fastening is made between the concave rubber disk and the hook or eye as set forth.

In testimony whereof we have signed our names to this specification in the presence of two subscribing witnesses.

J. STAINTON TAYLOR.
    CHARLES DAVIES.

Witnesses:
 G. C. DYMOND,
 W. H. BEESTON.